JOHN MORTON.

Improvement in Water Tanks for Railways.

No. 4,543. Reissued Sep. 5. 1871.

Witnesses
J. Twohig
B. Storrs Jr.

Inventor
John Morton
by Fisher & Fisher
his Attys.

UNITED STATES PATENT OFFICE.

JOHN MORTON, OF SEDALIA, MISSOURI, ASSIGNOR TO McGOWAN BROTHERS' PUMP AND MACHINE COMPANY, OF CINCINNATI, OHIO.

IMPROVEMENT IN WATER-TANKS FOR RAILWAYS.

Specification forming part of Letters Patent No. 63,418, dated April 2, 1867; reissue No. 4,543, dated September 5, 1871.

*To all whom it may concern:*

Figure 2:
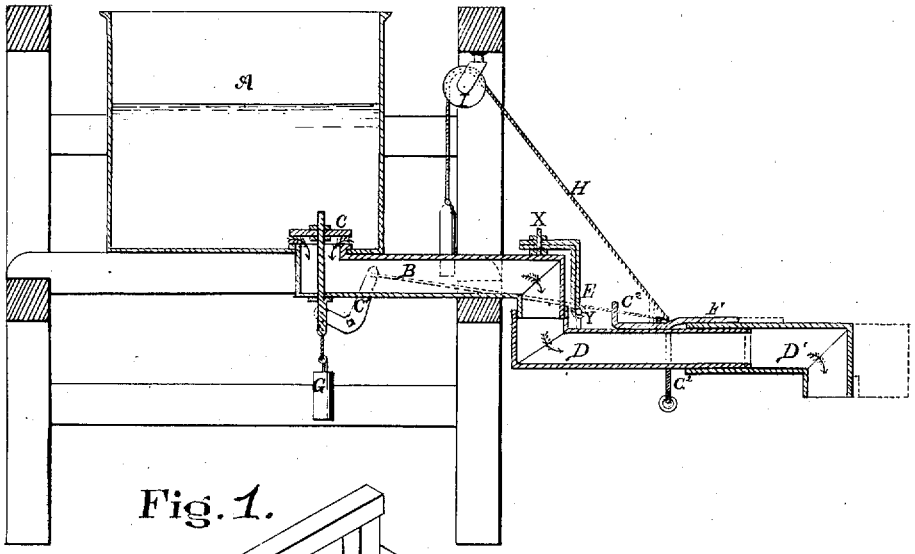
Figure 1:
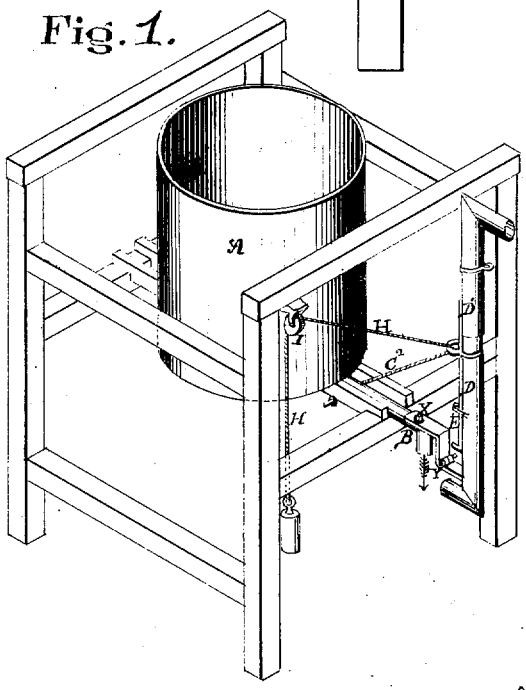

Be it known that I, JOHN MORTON, now of Sedalia, in the county of Pettis and State of Missouri, have invented a certain new and useful Improvement in Water-Tanks for Supplying Locomotives with Water, of which the following is a specification:

In the annexed drawing, Figure 1 is a perspective view, and Fig. 2 is a vertical section.

The same letters indicate like parts in both of the figures.

The nature of my invention consists in coupling the supply and conveyer-pipes of a tank in such a manner that the latter may be raised and lowered or be rotated horizontally upon the former without breaking joint.

A is a water-tank, from which the water is conducted through a supply-pipe, B, opening out of the bottom. This pipe is opened and closed by means of the valve C, the stem of which is adjustably attached to the bell-crank $C^1$, through which the valve may be opened by the cord $C^2$. When the cord is released the valve will be closed by the pressure of the water and the weight G attached to the valve-stem. The pipe terminates with a vertical elbow. D is the conveyer or delivery-pipe, suspended from the pipe B by the rod E, which is swiveled at X so as to permit free horizontal motion, and hinged at Y so as to permit the pipe D to be raised and lowered. The pin of the swivel X is located in the axes of the vertical elbows of pipes B and D, and at right angles to the axes of the pipes themselves. To facilitate the adjustment of the pipe D over the hole in the tank the pipe is made in two parts, D and D′, having a telescopic joint, by which the length of the pipe may be regulated at will. A rod, F, attached to the outer joint, passes through an eye on the inner joint, and is bent at the end to prevent the sliding joint D′ being separated from the joint D. Weights are attached to the connecting-pipe by cords H passing over adjustable pulleys I to counterbalance the weight of the pipe and facilitate its operation.

In the ordinary water-tanks the connecting-pipe is on the line of the pipe opening from the tank, and to accommodate it to the hole in the locomotive-tender the whole train has to be moved frequently several times backward and forward before the tender can be stopped in the right place.

My improvement consists in so constructing and attaching the connecting-pipe that it may be lengthened and shortened, and turned forward or backward, as may be necessary to connect it with the tender.

What I claim as my invention, and desire to secure by Letters Patent, is—

1. In combination with devices for raising and lowering the supply-pipe, the connection, substantially as described, whereby the conveyer and supply-pipes of the tank may be rotated upon each other without separation.

2. The combination of swivel X and jointed rod E with the supply and conveyer-pipes, when the axes of the connecting-mouths are at right angles with the axes of the spouts when in position for delivery.

3. The swivel-pin X, located in the axes of the supply and conveyer-pipes—when the latter are in position for delivery—when said swivel is connected by any suitable device with the supply-pipe so as to suspend the supply-pipe and permit its horizontal rotation and vertical elevation or depression.

4. The swivel X, when located on the top of the conveyer-pipe, and connected by any suitable device with the supply-pipe so as to suspend the supply-pipe and permit its horizontal rotation and vertical elevation or depression.

5. In combination with the tank A and stationary pipe B, a horizontally-adjustable connecting-pipe, D, arranged to operate substantially as and for the purpose set forth.

6. The combination of the horizontally-adjustable pipe D and the ropes and weights H and swivel-pulleys I, substantially as and for the purpose set forth.

7. The combination of the cord $C^2$, bell-crank $C^1$, and valve C with its stem and weights G, substantially as set forth.

JOHN MORTON.

Witnesses:
WILKINS WOOD,
EDWARD F. WARD.